(12) United States Patent
Hindi et al.

(10) Patent No.: US 6,864,194 B2
(45) Date of Patent: Mar. 8, 2005

(54) REINFORCED MEMBRANES FOR ROOFING AND OTHER APPLICATIONS

(75) Inventors: Majid H. Hindi, Littleton, CO (US); Allison Flynn, Golden, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/861,655

(22) Filed: Jun. 4, 2004

(65) Prior Publication Data

US 2004/0224176 A1 Nov. 11, 2004

Related U.S. Application Data

(62) Division of application No. 09/344,295, filed on Jun. 24, 1999, now Pat. No. 6,764,968.

(51) Int. Cl.[7] .............................................. B32B 27/12
(52) U.S. Cl. .............................. 442/37; 442/38; 442/41; 442/49
(58) Field of Search .............................. 442/37, 38, 41, 442/49

(56) References Cited

U.S. PATENT DOCUMENTS 4,589,804 A * 5/1986 Paeglis et al. .............. 405/270
5,891,541 A * 4/1999 Wynne ........................ 428/57

* cited by examiner

Primary Examiner—Ula Ruddock
(74) Attorney, Agent, or Firm—Robert D. Touslee

(57) ABSTRACT

A reinforced membrane, particularly well suited for use as a membrane in a single ply roofing membrane system, includes first and second thermoplastic olefin ("TPO") sheets and a polypropylene reinforcing mesh or scrim intermediate the first and second thermoplastic olefin sheets and bonded to the first and second thermoplastic olefin sheets.

11 Claims, 1 Drawing Sheet

REINFORCED MEMBRANES FOR ROOFING AND OTHER APPLICATIONS

This application is a division of application Ser. No. 09/344,295, filed Jun. 24, 1999, now U.S. Pat. No. 6,764,968.

BACKGROUND OF THE INVENTION

The present invention relates to a reinforced membrane and in particular to a recyclable reinforced membrane including two propylene-ethylene-copolymer (thermoplastic olefin or "TPO") sheets bonded to each other and to a polypropylene reinforcing mesh intermediate the propylene-ethylene-copolymer sheets. While the reinforced membrane of the present invention can be used for other applications, the reinforced membrane of the present invention is particularly well suited for use as a membrane in a single ply roofing system.

Single ply roofing membrane systems are commonly used as the roofing systems for low sloping roofs, especially in industrial and commercial applications. Typically, these single ply roofing membrane systems utilize roofing membranes which each include two propylene-ethylene-copolymer sheets bonded to each other and to a woven polyester reinforcing mesh or scrim located intermediate the propylene-ethylene-copolymer sheets. The propylene-ethylene-copolymer sheets provide the reinforced roofing membrane with good flexibility (including low temperature flexibility), good heat aging resistance, and good UV weathering characteristics. In addition the propylene-ethylene-copolymer sheets enable the roofing membranes in a roofing system to be hot air welded together. The woven polyester mesh or scrim in the roofing membrane provides the reinforced membrane with good tensile strength, puncture resistance and tear resistance.

While membranes using woven polyester meshes to reinforce the membranes perform satisfactorily, the use of woven polyester meshes in single ply roofing membranes has several drawbacks. A first problem associated with the use of woven polyester meshes in roofing membranes is the hydrophilic nature of such polyester meshes. Due to the hydrophilic nature of these polyester meshes, in use, roofing membranes made with polyester meshes will wick water into the roofing membranes along unsealed edges of the membranes and cause a deterioration in the performance of the roofing system. In addition, due to the incompatibility of these polyester meshes and the propylene-ethylene-copolymer sheets, another problem associated with the use of woven polyester meshes in roofing membranes made with propylene-ethylene-copolymer sheets is the inability to recycle scrap membrane, e.g. trim, back into the process producing the roofing membrane or to recycle the roofing membrane after use.

The following patents are representative of various roofing systems in the prior art. U.S. Pat. No. 3,663,350, issued May 16, 1972, discloses a roof deck laminate which includes a nylon, Dacron or polyester scrim between two polyvinyl chloride layers. U.S. Pat. No. 4,636,414, issued Jan. 13, 1987 discloses a bituminous roofing membrane which includes bituminous layers laminated to a fibrous sheet which may be made of polypropylene and a synthetic resin sheet. U.S. Pat. No. 5,260,111, issued Nov. 9, 1993, discloses a roofing membrane made of two rubber sheets and an intermediate sheet of thermoplastic film. U.S. Pat. No. 5,687,517, issued Nov. 18, 1997, discloses a roofing underlayment including at least two multi-layer plastic films.

SUMMARY OF THE INVENTION

The single ply membrane of the present invention may reduce the wicking problem associated with polyester scrim reinforced membranes and can be recycled both during the production process, if the membrane is out of specification, and after the membrane's useful service life in the field. While the membrane of the present invention can be used for other applications, the membrane of the present invention is especially well suited for use as a membrane in a single ply roofing membrane system.

The membrane of the present invention includes a pair of propylene-ethylene-copolymer (TPO) sheets and a polypropylene reinforcing mesh intermediate and bonded to the propylene-ethylene-copolymer sheets. Preferably, the propylene-ethylene-copolymer of the sheets is polymerized from a polypropylene and ethylene-monomer blend made up of about 30% to about 70% by weight polypropylene and about 30% to about 70% by weight ethylene-monomer. Preferably, the ethylene-monomer used in the blend results in an ethylene-propylene-rubber; an ethylene-propylene-monomer or an ethylene-propylene-diene-monomer (these are thermoplastic olefins which are referred to as "TPOs").

Since the polypropylene mesh is hydrophobic rather than hydrophilic like the polyester mesh, the wicking of water into the membrane along raw edges of the membrane while the membrane is in service should be reduced thereby enhancing the long term performance of the membrane. The chemical compatibility of the polypropylene mesh with the propylene-ethylene-copolymer sheets enables out of specification scrap produced during the manufacture of the membrane to be ground or chopped and recycled back into the process. After the membrane's useful service life, the chemical compatibility of the polypropylene mesh with the propylene-ethylene-copolymer sheets further enables the entire membrane to be recycled into another roofing product, such as atactic polypropylene ("APP-modified bitumen") roofing systems. In addition, the chemical compatibility of the polypropylene mesh and the propylene-ethylene-copolymer sheets promotes better bonding between the mesh and the sheets and provides the membrane with greater interlaminar strength.

DESCRIPTION OF THE PREFERRED EMBODIMENTS

Figure 1:
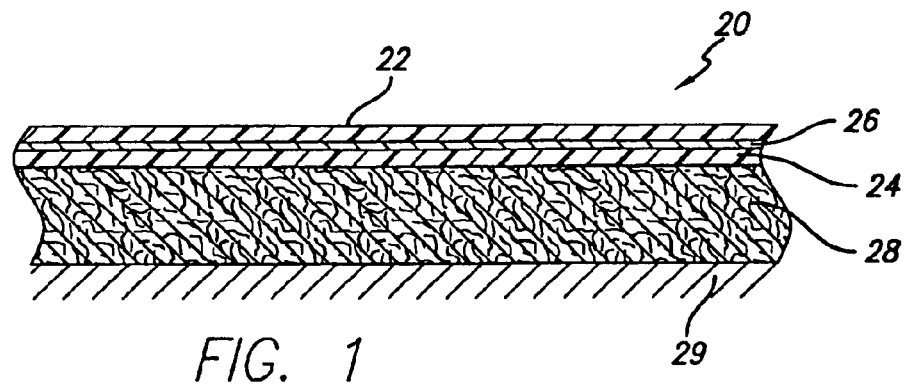
FIG. 1 is a schematic transverse cross section through a single ply membrane roofing system using the polypropylene mesh reinforced membrane of the present invention.

As schematically shown in FIG. 1, a typical single ply roofing membrane system utilizing the reinforced membrane 20 of the present invention includes: the reinforced membrane 20 of the present invention; a layer of a conventional insulation material 30; and the roofing deck 40. The reinforced membrane 20 overlays the insulation layer 30 and is typically secured to the roofing deck 40 with conventional mechanical fasteners (not shown).

The reinforced membrane 20 of the present invention includes a pair of propylene-ethylene-copolymer (thermoplastic olefin elastomer) sheets 22 and 24 and a polypropylene reinforcing mesh 26 intermediate and bonded to the propylene-ethylene-copolymer sheets. The reinforced membrane 20 is typically about 120 inches in width and generally varies from about 50 to about 150 feet in length. The propylene-ethylene-copolymer sheets 22 and 24 are bonded to each other and the polypropylene reinforcing mesh 26 through co-extrusion of the sheets and mesh or through lamination of the sheets and mesh by heat pressing the sheets and mesh together.

Preferably, the propylene-ethylene-copolymer of the sheets 22 and 24 is polymerized from a polypropylene and ethylene-monomer blend of about 30% to about 70% by weight polypropylene and about 30% to about 70% by weight ethylene-monomer. In addition, to the polypropylene and the ethylene-monomer, the blend normally contains antioxidants, UV stabilizers, fillers, pigments, and, if necessary, flame retardants. Preferably, the ethylene-monomer used in the blend is an ethylene-propylene-rubber; an ethylene-propylene-monomer or an ethylene-propylene-diene-monomer. Examples of propylene-ethylene-copolymer blends which can be used to form the sheets 22 and 24 are blends sold by Montell Polyolefins under the trademarks "ASTRYN" and "ADFLEX".

Preferably, the polypropylene reinforcing mesh is a woven mesh. However, the mesh may be a "non-woven" mesh, such as but not limited to, a spunbond mesh. A typical polypropylene mesh 26 will have between 5×5 squares (openings) per square inch and 12×13 squares (openings) per square inch and be made of polypropylene strands having a denier between about 500 and about 1000. An example of a woven polypropylene mesh, which can be used as the polypropylene mesh reinforcement 26 in reinforced membrane 20 of the present invention, is woven mesh sold by Synthetic Industries of Chattanooga Tenn. under the designation HD.

Figure 2:
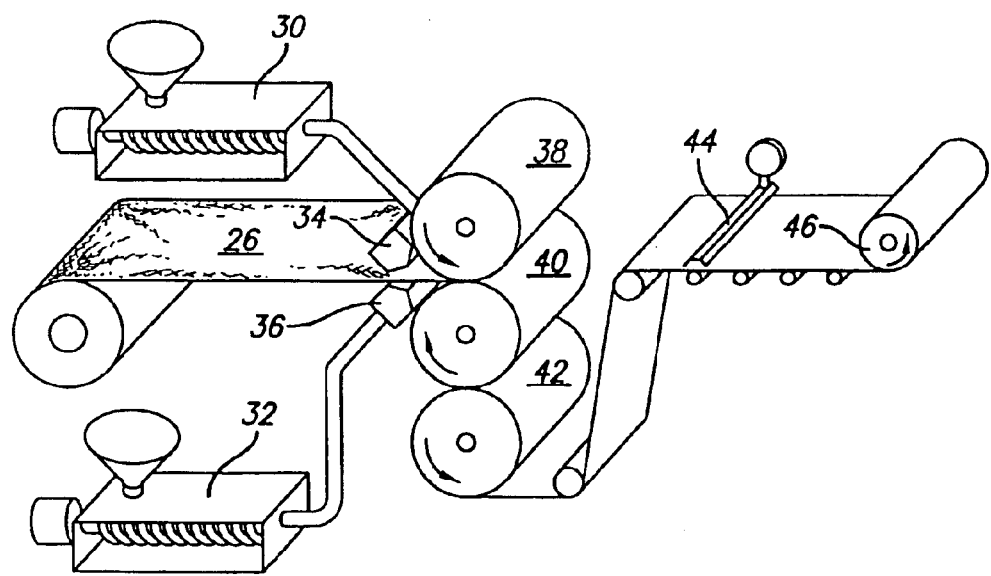
FIG. 2 is a schematic perspective view of a production line for making the polypropylene mesh reinforced membrane of the present invention.

The preferred method for manufacturing the reinforced membrane 20 of the present invention is by co-extrusion. As schematically shown in FIG. 2, a process line for manufacturing the reinforced membrane 20 includes: two extruders 30 and 32; two sheet extrusion dies 34 and 36; a supply roll of polypropylene reinforcing mesh 26; first and second smooth surfaced calendar rolls 38 and 40; a third, cooled, smooth surfaced calendar roll 42; a thickness gauge control 44; and a wind up 46. The propylene-ethylene-copolymer material is fed into each of the extruders 30 and 32 and passes from the extruders through the two extrusion dies 34 and 36, in a liquid melt state, to form the sheets 22 and 24 on both sides of the polypropylene reinforcing sheet 26 being fed from the supply roll. In its melt state, the propylene-ethylene-copolymer material from each extrusion die 34 and 36 not only forms a sheet on one side of the polypropylene reinforcing mesh 26, but also passes through the openings in the polypropylene mesh 26 and into contact with the propylene-ethylene-copolymer material being dispensed from the other extrusion die. The sheets 22 and 24 of propylene-ethylene-copolymer material, with the polypropylene reinforcing mesh 26 intermediate the sheets 22 and 24, are then fed between: a) the calendar rolls 38 and 40 to press the hot sheets 22, 24 and reinforcing mesh 26 together under pressure while the propylene-ethylene-copolymer of the sheets is still in a viscous state; and b) the calendar rolls 40 and 42 to shape and cool the propylene-ethylene-copolymer material of the sheets and the set the thickness of the reinforced membrane 20. Thus, through the co-extrusion of the propylene-ethylene-copolymer material on either side of the polypropylene reinforcing mesh 26, the sheets 22 and 24 formed from the propylene-ethylene-copolymer material are bonded to the mesh and to each other to form the membrane 20. The reinforced membrane 20 then passes through the gauge control 44 which monitors the thickness of the reinforced membrane for quality control and is wound up into a roll in the windup 46 for packaging.

Preferably, the reinforced membrane 20 will have the following initial properties: a nominal thickness of 0.039 inches as measured by ASTM D 751 test method; a minimum breaking strength of 225 pounds of force as measured by ASTM D 751 Grab Method; a minimum elongation to break of 15% as measured by ASTM D 751 Grab Method; and a minimum tearing strength of 55 pounds of force as measured by ASTM D 751 Procedure B, 8 inch by 8 inch sample. Preferably, the reinforced membrane 20 will have the following properties after heat aging in accordance with ASTM D 753, 670 hours at 240° F./116° C.: a minimum breaking strength of 202.5 pounds of force as measured by ASTM D 751 Grab Method; a minimum elongation to break of 13.5% as measured by ASTM D 751 Grab Method; and a maximum water absorption weight change of plus or minus 4% as measured by ASTM D 471, procedure for change in mass with liquid on one surface only. Preferably, the reinforced membrane 20 will also exhibit the following properties: a maximum linear dimensional change of plus or minus 2% as measured by ASTM D 1204 6 hours at 158° F./70° C.; and a minimum puncture resistance as measured by ASTM D 4833 of 90 lbf at 73° F./73° C.

While co-extrusion is preferred, it is also contemplated that the reinforced membrane 20 could be manufactured by passing two previously formed sheets 22 and 24 and a polypropylene reinforcing mesh 26 between heated, smooth surfaced calendar rolls which would bond the sheets 22 and 24 together and to the polypropylene reinforcing mesh 26 through heat and pressure.

While it is preferred to form the thermoplastic olefin elastomer used make the sheets 22 and 24 of the reinforced membrane 20 by the direct polymerization of a polypropylene and ethylene-monomer blend, it is also contemplated that the thermoplastic olefin elastomer used in sheets 22 and 24 can be made by mixing, compounding or blending ethylene-propylene-rubber, ethylene-propylene-monomer, or ethylene-propylene-diene-monomer with polypropylene in mixing equipment such as Banbury mixers or Farrel Continuous mixers. However, this method of forming the thermoplastic olefin elastomer (TPO) is generally more expensive.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A single ply roofing membrane system comprising:
a roof deck; and
a recyclable, reinforced membrane overlaying the roof deck; the membrane having first and second propylene-ethylene-copolymer sheets polymerized from a polypropylene and ethylene-monomer blend comprising about 30% to about 70% by weight polypropylene and about 30% to about 70% by weight ethylene-monomer and a hydrophobic polypropylene reinforcing mesh intermediate the first and second propylene-ethylene-copolymer sheets and bonded to the first and second propylene-ethylene-copolymer sheets for reinforcing the membrane; the polypropylene reinforcing mesh being chemically compatible with the first and second propylene-ethylene-copolymer sheets for permitting scrap produced in a process of manufacturing the membrane to be recycled back into the process.

2. The single ply roofing membrane system according to claim 1, wherein:
the ethylene-monomer in the blend is selected from a group consisting of ethylene-propylene-rubber; ethylene-propylene-monomer; and ethylene-propylene-diene-monomer.

3. The single ply roofing membrane system according to claim 2, wherein:
the first and second propylene-ethylene-copolymer membrane sheets are bonded together and to the polypropylene reinforcing mesh intermediate the first and second propylene-ethylene-copolymer membrane sheets by co-extruding the first and second propylene-ethylene-copolymer sheets with the polypropylene reinforcing mesh intermediate the first and second propylene-ethylene-copolymer membrane sheets.

4. The single ply roofing membrane system according to claim 3, wherein:
the polypropylene reinforcing mesh is a woven mesh.

5. The single ply roofing membrane system according to claim 1, wherein:
the first and second propylene-ethylene-copolymer membrane sheets are bonded together and to the polypropylene reinforcing mesh intermediate the first and second propylene-ethylene-copolymer membrane sheets by co-extruding the first and second propylene-ethylene-copolymer sheets with the polypropylene reinforcing mesh intermediate the first and second propylene-ethylene-copolymer membrane sheets.

6. The single ply roofing membrane system according to claim 5, wherein:
the polypropylene reinforcing mesh is a woven mesh.

7. The single ply roofing membrane system according to claim 1, wherein:
the polypropylene reinforcing mesh of the membrane is a woven mesh.

8. The single ply roofing membrane system according to claim 1, wherein:
the propylene-ethylene-copolymer of the membrane sheets is polymerized from a polypropylene and ethylene-monomer blend consisting essentially of between 30% and 70% by weight polypropylene and between 30% and 70% by weight ethylene-monomer.

9. The single ply roofing membrane system according to claim 8, wherein:
the ethylene-monomer in the blend is selected from a group consisting of ethylene-propylene-rubber; ethylene-propylene-monomer; and ethylene-propylene-diene-monomer.

10. The single ply roofing membrane system according to claim 9, wherein:
the first and second propylene-ethylene-copolymer membrane sheets are bonded together and to the polypropylene reinforcing mesh intermediate the first and second propylene-ethylene-copolymer membrane sheets by co-extruding the first and second propylene-ethylene-copolymer sheets with the polypropylene reinforcing mesh intermediate the first and second propylene-ethylene-copolymer membrane sheets.

11. The single ply roofing membrane system according to claim 10, wherein:
the polypropylene reinforcing mesh is a woven mesh.

* * * * *